United States Patent
Sacca et al.

(10) Patent No.: US 6,529,598 B1
(45) Date of Patent: Mar. 4, 2003

(54) METHOD AND APPARATUS FOR DIGITAL PABX DETECTION AND MODEM INTERFACE PROTECTION

(75) Inventors: Frank Sacca, Diamond Bar, CA (US); Alberto Mantovani, Laguna Niguel, CA (US); James Bunde Villadsen Skov, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/312,178

(22) Filed: May 14, 1999

(51) Int. Cl.$^7$ .............................................. H04M 11/00
(52) U.S. Cl. .............................. 379/395.01; 379/27.05; 379/93.05; 379/2
(58) Field of Search ................................ 379/395.01, 2, 379/27.01, 27.04, 27.05, 27.08; 361/78

(56) References Cited

U.S. PATENT DOCUMENTS

| | | | |
|---|---|---|---|
| 5,018,190 A | 5/1991 | Walker et al. | ........... 379/93.02 |
| 5,392,334 A | 2/1995 | O'Mahony | ................. 379/67.1 |
| 5,625,679 A | 4/1997 | Gutzmer | ................. 379/93.37 |
| 5,802,151 A * | 9/1998 | Bevill et al. | ............. 379/93.05 |

* cited by examiner

Primary Examiner—Forester W. Isen
Assistant Examiner—Daniel Swerdlow
(74) Attorney, Agent, or Firm—Procopio, Cory, Hargreaves & Savitch, LLP

(57) ABSTRACT

The line interface circuit of a modem to be connected to a standard RJ11 jack of a digital PBX (Private Branch Exchange) is used along with software routines resident in the modem to detect the presence of a PBX connected to the modem. Upon going off-hook, the modem, by the software routines, determines whether the connection will harm the interface by one of several software routines. If it appears that the interface circuit may be damaged because a PBX line is present, the modem is instructed to go on-hook (hang up), or if the connection is not harmful to the interface, alerts the user that the modem is connected to a wrong jack.

25 Claims, 4 Drawing Sheets

METHOD AND APPARATUS FOR DIGITAL PABX DETECTION AND MODEM INTERFACE PROTECTION

CROSS-REFERENCES TO RELATED APPLICATIONS

This application is related to U.S. patent application Ser. No. 09/212,707 entitled, TELEPHONE LINE INTERFACE CIRCUIT WITHOUT HOOK SWITCH, filed Dec. 16, 1998, U.S. patent application Ser. No. 09/312,136, entitled, ELECTRONIC INDUCTOR WITH TRANSMIT SIGNAL TELEPHONE LINE DRIVER, filed May 14, 1999, and U.S. patent application Ser. No. 09/312,412, entitled TELEPHONE LINE INTERFACE CIRCUIT WITH INTELLIGENT LINE CURRENT AND VOLTAGE CONTROL, filed May 14, 1999. All of these applications are commonly owned by the assignee of the present application. The disclosures of all of these applications are explicitly incorporated herein by reference.

BACKGROUND OF THE INVENTION

1. Field of the Invention

The present invention relates generally to improvements and telephone modems and, more particularly, pertains to new and improved digital telephone modems with line protection devices.

2. Description of Related Art

A telephone modem can be seriously damaged if it is accidentally connected to a digital Private Branch Exchange (PBX) terminal which are readily found in office environments. A digital PBX terminal (DPBX) looks and acts just like a standard RJ11 jack that is used for the public switch telephone network (PSTN), or an analog PBX. A PSTN terminal is equivalent to a 20 to 100 volt battery at the central office in series with a loop resistance which can vary between 200 ohms and 5,000 ohms. A DPBX terminal, on the other hand, is equivalent to a 10 to 100 volt battery with a resistance of less than 10 ohms. If a telephone modem is connected to the digital PBX terminal, the current through the modem will exceed the maximum expected limits without any drop in voltage at the tip and ring terminals. The resulting excess power will permanently damage the line interface circuit of the modem. Attempts to prevent damage to a telephone modem which is accidentally connected to a DPBX jack have used such devices as optoisolators to detect excessive current flow through the line interface circuitry of the modem. When excessive current is detected in this manner, the modem goes "on-hook," thereby protecting the circuit from being damaged. Although these prior art devices may be satisfactory in their operation, the additional hardware required to implement the line protection function increases the cost of the modem inordinately. Furthermore, these prior art solutions cannot be used in a line interface configuration which limits the line current in itself. The present invention, on the other hand, uses the software-based architecture of its modem to implement a line protection device without adding additional hardware and is well-suited for use with all interface circuits.

SUMMARY OF THE INVENTION

To prevent damage to a modem that is accidentally connected to a digital PBX terminal which looks just like a standard RJ11 jack of the PSTN, the modem is equipped with software routines that use voltage readings from the modem telephone line interface circuit to identify a PBX connection and cause the modem to go on-hook. The ADC (analog-to-digital converter) of the modem measures the t-r line voltage through a resistor divider network. Based on this voltage, the software calculates either the power through the interface in off-hook state, or the rate of change of the line voltage over time while going off-hook, or the loop resistance of the PSTN. If the power is too high for the interface, the voltage rate of change is less than a predetermined amount or the loop resistance is less than an expected minimum, the software directs the modem to go on-hook.

BRIEF DESCRIPTION OF THE DRAWINGS

The objects and many of the attendant advantages of this invention will be readily appreciated and better understood by reference to the following detailed description when considered in conjunction with the accompanying drawings in which like reference numerals designate like parts throughout the figures thereof and wherein.

DETAILED DESCRIPTION OF THE PREFERRED EMBODIMENTS

Figure 1:
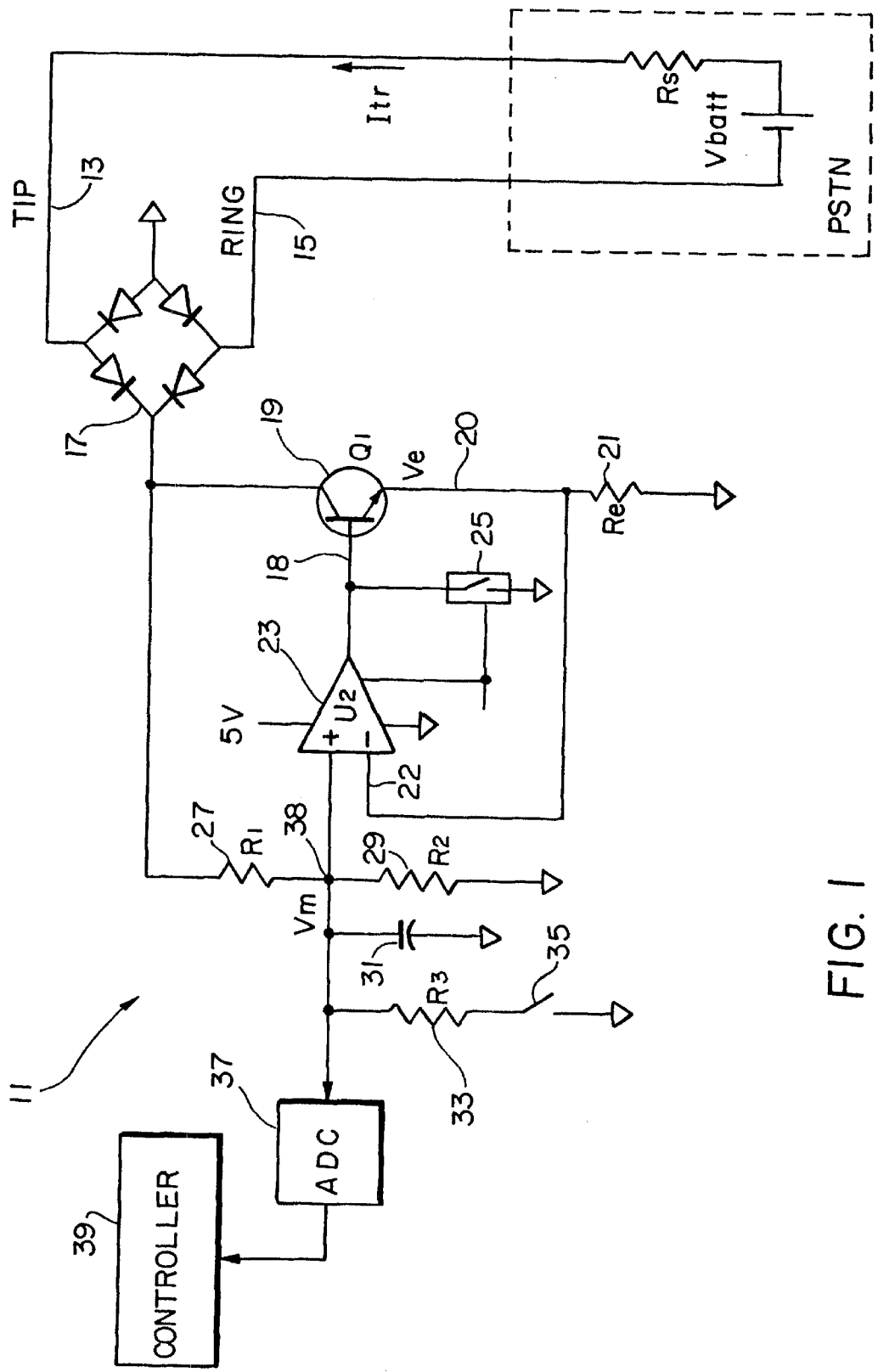
FIG. 1 is a circuit diagram of the interface circuit and modem utilized to execute the present invention.

Prior art systems guard against damage to a modem when it is connected to a digital PBX terminal by measuring the current through the modem's line interface circuit. When this current exceeds a predefined threshold, the modem concludes that the excessive current is caused by the presence of a digital PBX line. This method of detecting the presence of a digital PBX line has limited applicability and cannot be used with certain modem designs, especially those modems that utilize an interface circuit as shown in FIG. 1. FIG. 1 shows an interface circuit 11 connected to a modem (not shown) having an ADC 37 and a controller 38. The interface circuit 11 of FIG. 1 is powered by a fixed voltage supply. A Q1 transistor 19 automatically limits the line current to the maximum current expected from a PSTN worldwide, about 150 mA. Therefore, the current measured through the modem would never exceed the maximum limit and the modem could not determine from this current reading whether it was connected to a digital PBX line. Some DPBX terminals have voltages as low as 10 volts. When a modem is connected to such a terminal, the current will be relatively small, i.e., 10–30 mA. A method based on measuring current would fail to detect the presence of such a DPBX terminal.

Furthermore, the prior art method of current measurement to determine connection to a PBX line would be difficult to implement in a modem designed for worldwide use. The current threshold selected for the line interface circuit changes depending on the requirements of each country. Although the various current thresholds could be programmed for each specific country, such a solution would be complicated and costly to implement and could result in misdetection.

Modem line interface circuit 11 typically has a resistance of 100 to about 400 ohms when it is in an off-hook state. It is designed to dissipate less than 3 watts of power. A DPBX or digital private branch exchange (DPABX) terminal has the equivalent of a 10 to 100 volt battery, with loop resistance of less then 10 ohms. As a result, when a modem designed for the PSTN goes off-hook while connected to a DPBX tip and ring (t-r) terminal, the power dissipation in the line interface circuit 11 may exceed the maximum power rating and result in permanent damage.

Tip terminal 13 and ring terminal 15 are connected to the interface circuit 11 through a diode bridge 17 to a resistor divider circuit made up of R1 resister 27 and R2 resistor 29. The values of resistances 27 and 29 are chosen to be very large in order to make the current through them negligible compared to the current through Q1 transistor 19. As a result, the current through Q1 transistor 19 is equal to the line current. A U2 operational amplifier 23 converts the voltage at node 38 to the current required to drive the base 18 of Q1 transistor 19. The negative input 22 of U2 operational amplifier 23 is connected to the emitter 20 of Q1 transistor 19 thereby effectively making the voltage at node 38 equal to the voltage at emitter 20 of Q1 resistor 19. Since the base current of Q1 transistor 19 is negligible compared to the line current through Q1 transistor 19, line current can be calculated as voltage drop across Re emitter resistor 21.

When the modem is on-hook, switch 35 is closed placing R3 resistor 33 in parallel with R2 resistor 29. Switch 25 is also closed, shorting the base 18 of Q1 transistor 19 to ground, effectively turning off QI transistor 19 and disabling U2 operational amplifier 23.

Switch 35 is closed to increase the dynamic range of the ADC with respect to Vtr by adding $R_3$ transistor 33 in parallel with $R_2$ resistor 29 so that a relatively large Vtr can be measured within the limited voltage range of the ADC (typically 0–4V). For example, if Vtr is expected to be 100 volts, $R_3$ is chosen so that the ratio $(R_2//R_3)/R_1+R_2//R_3)$ is approximately 25 (100V/4 V). Switch 35 can also be enabled while off-hook, typically to comply with European specifications where the line current is limited to 60 mA and Vtr can be as high as 40 V in off-hook state.

When the modem goes off-hook switches 35 and 25 are open. The U2 operational amplifier 23 becomes enabled and the voltage feedback from the tip and ring terminals 13, 15 at node 38 causes line current to flow through Q1 transistor 19. An analog-to-digital converter, ADC 37, reads the voltage at node 38 while the modem is off-hook. Based on this reading, controller 39 determines the voltage at tip and ring 13, 15 according to the following equation:

$$Vtr = Vn[(R_1 + R_2//R_3)/(R_2//R_3)] \quad [1]$$

Since the voltage at node 38 while the modem is on-hook is a voltage at the tip and ring terminal 13, 15 without drawing any current from the telephone line, this voltage represents the battery voltage at the central office.

When the modem goes off-hook, the ADC 37 continues to read the voltage at node 38 and the controller 39 monitors the line voltage as the line current increases. Based on the assumptions discussed above, the controller can also measure the line current at any point in time by the following equation:

$$Itr = \frac{Ve}{Re} \quad [2]$$

since $$Vn = Ve$$

then $$Itr = \frac{Vn}{Re}$$

As a result, the controller 39 can monitor both line voltage and line current by using the Vn reading at node 38 obtained by ADC 37 at any point in time.

As can be seen by the above equation, although the line current can be monitored by reading the voltage across Re resistor 21, this line current quantity cannot be used by the controller to make a decision as to whether a digital PBX line is present. The U2 operational amplifier 23 is powered by a fixed voltage supply of 5 volts. The output of the U2 operational amplifier 23 can never exceed 5 volts by definition. The emitter 20 of Q1 transistor 19, as a consequence cannot exceed 4.3 volts, assuming a typical base to emitter voltage of 0.7 volts. Therefore, Q1 transistor 19 automatically limits line current to a maximum value which is intentionally selected to be the maximum current expected from a PSTN worldwide, about 150 mA, by choosing an appropriate value for Re resistor 21. Furthermore, if the DPBX voltage is 20V and the line interface resistance is 400 ohms, for example, the current through the interface would be only 20V/400 Ω=50 mA, with total power dissipation at 20V×50 mA=1 watt. The modem, by way of the ADC 37 and controller 39, thus would not be able to determine from these current readings whether a digital PBX line is present.

The present invention contemplates several different software processes to detect a digital PBX line. The process utilized would depend, in part, upon the interface circuit 11 configuration.

Figure 2:
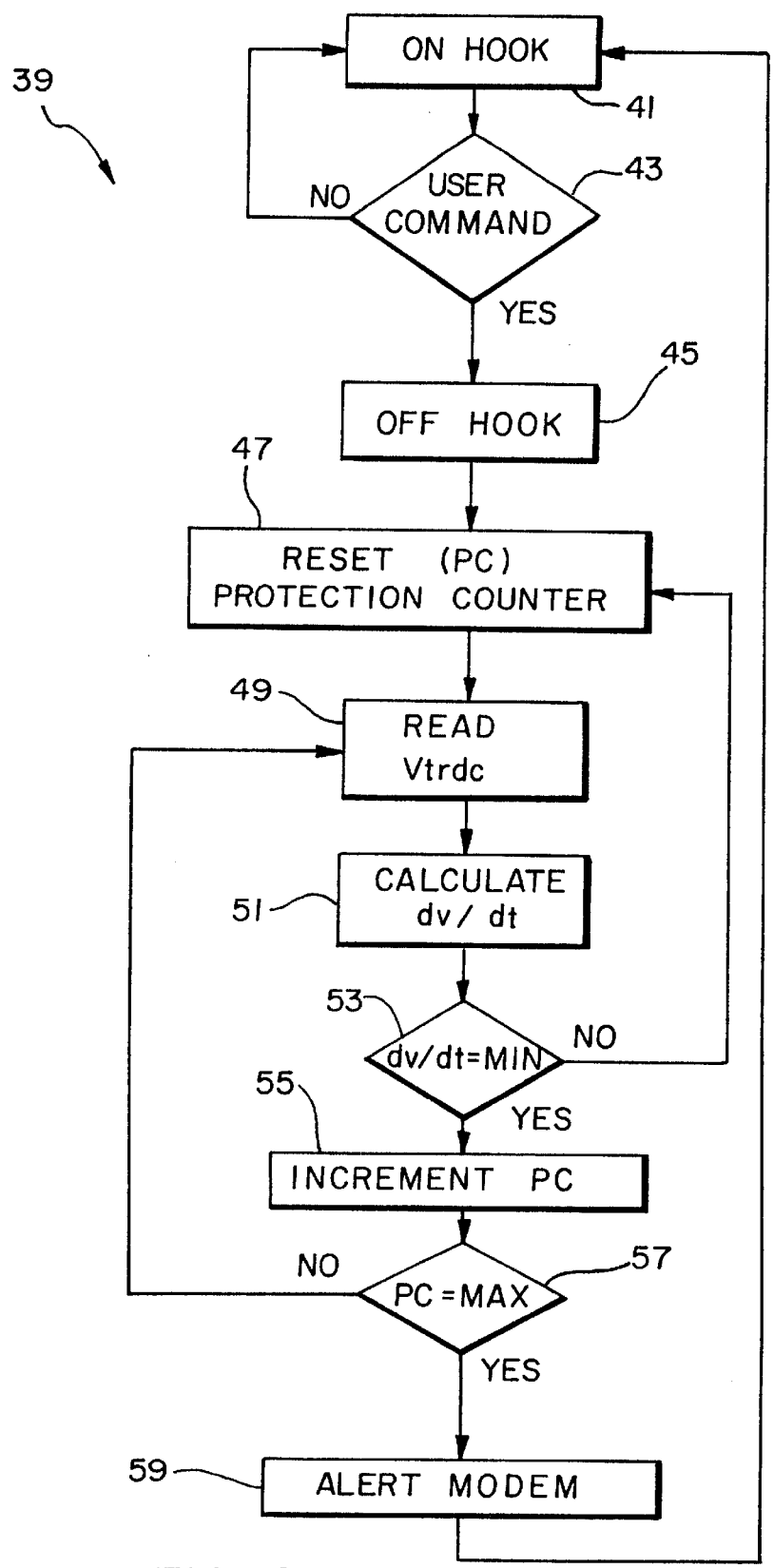
FIG. 2 is a flow chart showing the steps taken by the software in the modem to provide for line protection pursuant to one method of the present invention.

The interface circuit 11 of FIG. 1 is particularly adaptable to a voltage gradient method which is illustrated in FIG. 2.

The flow chart of FIG. 2 illustrates the voltage gradient method 39 of detecting whether a digital PBX line is connected to the interface circuit of the modem. The process involves the general steps of the ADC 37 and controller 39 measuring the line voltage at the tip and ring terminals 13, 15 immediately before the modem goes off-hook while it is still on-hook, and repeatedly after going off-hook. This voltage is measured in the manner explained above by monitoring the Vn voltage at node 38. If the voltage measured in this way does not change fast enough as a function of time over a predetermined amount of time, the modem concludes that an unusual condition is present, like a PBX line, and alerts the modem of a fault condition causing the modem to go on-hook and notifying the user.

Generally, the presence of capacitor 31 connected between Vn and ground, which is required to filter out AC signals from Vn node 38, causes a slow transient of the voltage at tip to ring while going off-hook, typically on the order of 100 ms. Inductance in the PSTN can also cause such a transient.

The specific voltage gradient method 39 illustrated in FIG. 2 consists of an on-hook state 41, while a controller measures the line voltage. Upon receiving a user command 43, the controller instructs the modem to go off-hook 45. The controller continues to measure the Vn voltage at node 38 and at the same time presets 47 a protection counter. The controller continues to read the voltage at node 38. For each voltage measurement of node 38, the controller calculates 51, the derivative of the voltage with respect to time and compares 53 each calculation with a predetermined minimum. If the derivative equals the minimum, the controller increments 55 the protection counter. The controller periodically compares 57 the contents of the protection counter with a predetermined maximum count. If that maximum count is reached, the controller alerts the modem 59 that a fault condition exists, causing the modem to go on-hook and notify the user.

The protection counter limit is determined by the sampling period T of the power P, and is chosen so that P×T results in an acceptable energy dissipation in the line interface circuit, over the total sampling time.

Another method of determining whether a PBX line is connected to the modem can be thought of as a power method which can be utilized with any number of interface circuits, as well as interface circuit 11 of FIG. 1. In the power method, the controller repeatedly measures the Vn voltage at the node 38 in the manner discussed above, after going off-hook. This voltage is multiplied by the current through Q1 interface transistor 19 to obtain the instantaneous power through the interface circuit. The instantaneous power dissipation in the interface, the calculated power, is compared to a predetermined maximum rating for that interface. If the calculated power exceeds that rating for a predetermined number of readings the modem concludes that a digital PBX line is present and causes the modem to go off-hook.

Figure 3:
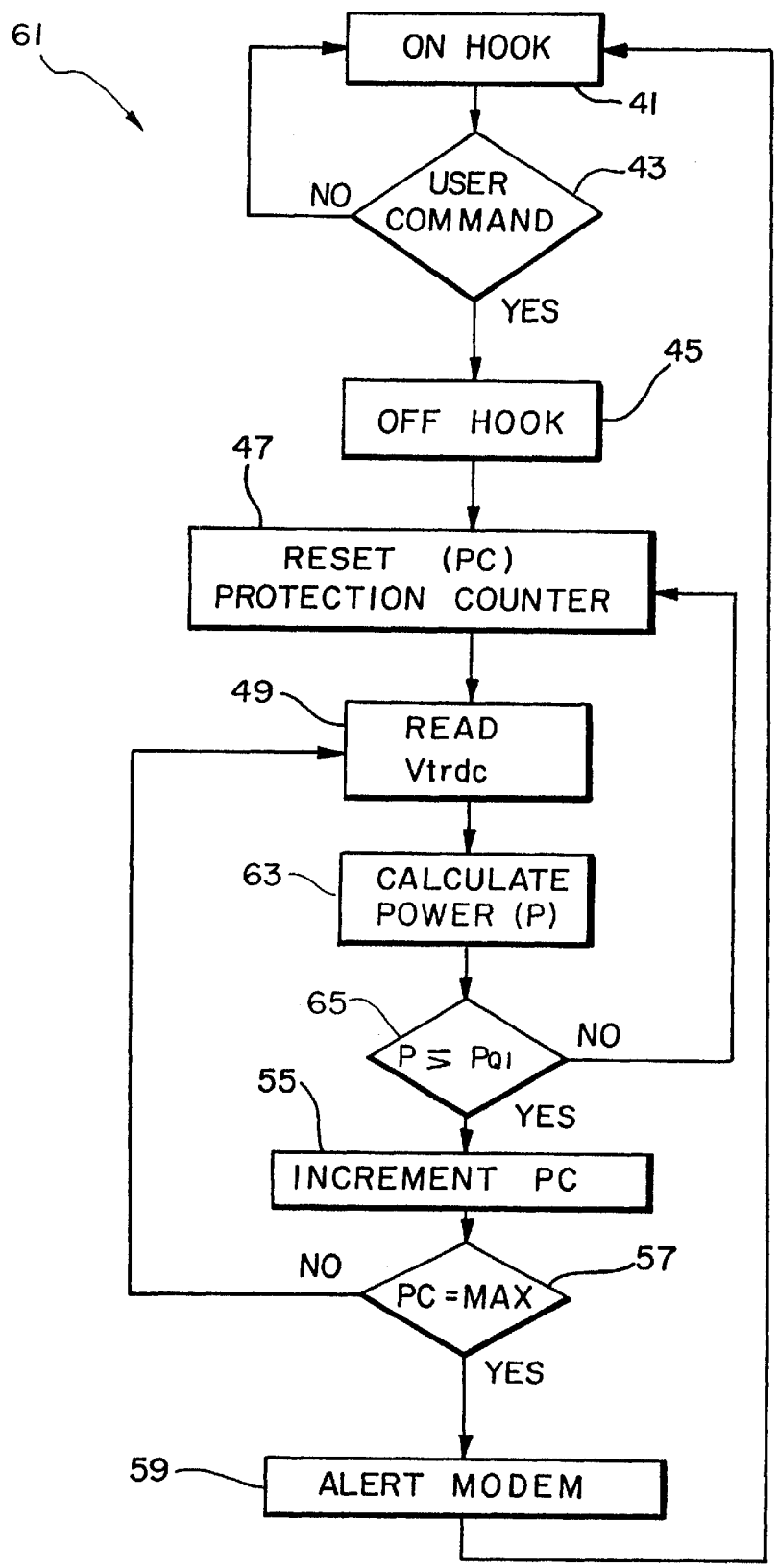
FIG. 3 is a flow chart of the steps taken by the software to provide line protection under another method of the present invention.

The power method of detecting a PBX line 61 connection to the interface circuit is shown in FIG. 3. When the modem is on-hook 41, the controller is waiting for a user command 43 telling it to go off-hook 45. Upon going off-hook, the controller resets 47 the protection counter and reads the Vn voltage at node 38 to determine the Vtr tip to ring voltage according to equation [1]. The controller obtains the interface current by using equation [2]. This current is multiplied by the Vtr (tip to ring) voltage to obtain the power 63 through the system. This calculated power is compared 65 to a maximum power rating for the interface circuit. If the calculated power exceeds this maximum power rating, the protection counter is incremented 55. The controller monitors 57 the contents of the protection counter to determine if it has reached its maximum count. If it has, the controller notifies 59 the modem of a fault condition, and instructs it to go on-hook.

The power method is particularly suited for protection of the modem line interface circuit. However, if the voltage of DPBX is reasonably low and the modem resistance is high, the power method would fail to detect the presence of a DPBX.

For example, if the DPBX voltage is 20V and the modem resistance is 400 ohms, the current through the modem would be 20V/400 ohms=50 mA and the power dissipation would be 20V×50 mA=1 W. This power is well within the maximum rating of the line interface circuit, and therefore the controller would not detect the presence of the DPBX.

Figure 4:
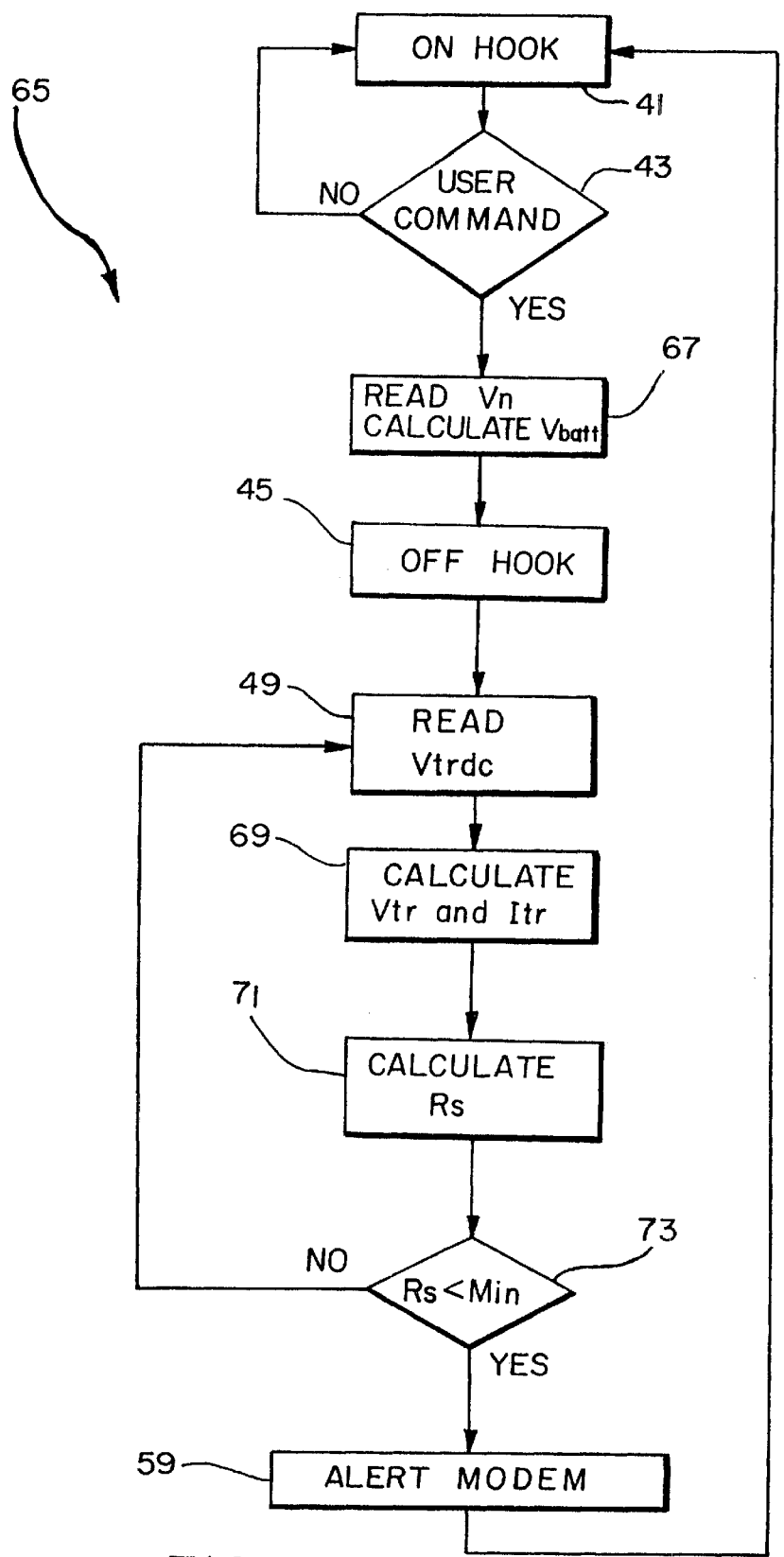
FIG. 4 is a flow chart of the steps taken by the software to provide line protection under yet another method of the present invention.

The flow chart of FIG. 4 describes a loop resistance method 65 that overcomes this problem. When the modem is on-hook 41, the controller calculates the voltage Vtr 67 using equation [1], which represents the battery voltage, Vbatt, at the central office (CO), as explained above. When the modem goes off-hook 45, the controller determines 69 line voltage Vtr and line current Itr using equations [1] and [2], respectively. Assuming the simple DC circuit model for the PSTN shown in FIG. 1, the following equation will be true:

$Vbatt - Rs \times Itr = Vtr$ solved for $Rs$ yields $$Rs = (Vbatt - Vtr)/Itr \quad [3]$$

Using equation [3], the controller calculates 71 the equivalent loop resistance Rs of the PSTN. If Rs is less than an expected minimum value Rs (min) 73, the controller concludes that a DPBX or other unusual network is present, sets the modem on-hook 59 and notifies the user of the condition.

The controller can also determine the loop resistance while off-hook, without necessarily reading the on-hook line voltage Vtr. Since equation [3] is true for any values of Vtr and Itr, the controller goes off-hook and takes two readings 69 of Vtr and Itr, at time t(1) and time t(2). The following system of two equations can be written:

$Vbatt - Rs \times Itr(1) = Vtr(1)$ $$Vbatt - Rs \times Vtr(2) = Vtr(2) \quad [4]$$

Solving equations [4] for the unknown variables Rs and Vbatt, the controller calculates 71 the value of Rs and determines if a DPBX is present, as above.

The controller can also determine the CO battery voltage Vbatt and the loop resistance Rs while off-hook, without necessarily reading the on-hook line voltage Vtr. Since equation [3] is true for any values of Vtr and Itr, the controller can take two independent readings of Vtr and Itr at state (1) and state (2). These two states can differ from each other by a different setting of the DAC, for example, or by having switch S1 enabled or disabled, respectively. The following system of two equations in two unknowns, Vbatt and Rloop, can then be written:

$Vbatt - Rloop \times Itr(1) = Vtr(1)$ $$Vbatt - Rloop \times Itr(2) = Vtr(2) \quad [5]$$

and the controller can then calculate the values of Vbatt and Rloop and determines if a DPBX is present, as above.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. Apparatus in a modem for detecting the presence of a DPBX connected to the t-r connection of a modem interface, comprising:

an analog-to-digital converter for reading the t-r voltage when the modem is on-hook and after the modem goes off-hook; and a controller for measuring the rate of change of the measured t-r voltage after the modem goes off-hook and commanding the modem to go on-hook if the rate of change of the t-r voltage is not fast enough.

2. The apparatus of claim 1 wherein the analog-to-digital converter reads the voltage of a node in the modem interface and the controller calculates the t-r voltage.

3. The apparatus of claim 2 wherein the controller calculates the rate of change of the node voltage and if the rate of change is small, directs the modem to go on-hook.

4. The apparatus of claim 2 wherein the analog-to-digital converter reads the voltage of a node in the modem interface and the controller calculates the voltage at the t-r terminals of the interface, once before the modem goes off-hook and repeatedly after going off-hook.

5. The apparatus of claim 4 wherein the controller calculates the rate of change of all the calculated t-r voltages and if the rate of change is small, directs the modem to go on-hook.

6. Apparatus in a modem for detecting the presence of a DPBX connected to the t-r connection of a modem interface comprising:

an analog-to-digital converter for reading the t-r voltage and the t-r line current while the modem is off-hook; and a controller for multiplying the read voltage and current to obtain a value representing power through the modem, comparing this calculated value with the maximum power rating for the modem and directing the modem to go on-hook if the calculated power exceeds the power rating.

7. The apparatus of claim 6 wherein the analog-to-digital converter reads the voltage of a node in the modem interface and the controller calculates the t-r voltage.

8. The apparatus of claim 7 wherein the controller calculates the current through the interface using the read voltage.

9. The apparatus of claim 8 wherein the controller calculates power through the interface using the calculated t-r voltage and calculated current, and if the power exceeds the maximum power rating of the interface, tells the modem to go on-hook.

10. A method for detecting whether the tip (t) and ring (r) connections of a modem interface are being connected to a DPBX, the steps of the method comprising:

reading voltage at tip and ring connection of the modem interface;

calculating the rate of change of the tip and ring voltage after modem goes off-hook;

comparing calculated rate of change of tip and ring voltage to a predetermined minimum; and instructing modem to go on-hook if calculated rate of change of tip and ring voltage is at predetermined minimum.

11. The method of claim 10 wherein said reading step comprises reading the voltage first before the modem goes off-hook and repeatedly after the modem goes off-hook.

12. The method of claim 11 further comprising the step of resetting a protection counter in response to the modem going off-hook.

13. The method of claim 12 further comprising, after the comparing step, the step of incrementing the protection counter if the calculated rate of change is at a minimum.

14. The method of claim 13 further comprising the step of determining if the protection counter is at its maximum count.

15. The method of claim 14 further comprising the step of detecting that the modem is connected to a DPBX.

16. A method for detecting whether the tip (t) and ring (r) connections of a modem interface are being connected to a DPBX, the steps of the method comprising:

reading voltage at tip and ring connections of the modem interface;

reading current through the interface;

calculating the power through the interface;

comparing calculated power through the interface with the maximum rated power for interface; and instruct modem to go on-hook if calculated power exceeds maximum rated power of the interfaces.

17. The method of claim 16 further comprising the step of resetting a protection counter in response to the modem going off-hook.

18. The method of claim 17 further comprising, after the comparing step, the step of incrementing the protection counter if the calculated power is equal or greater than maximum rated power of the interface.

19. The method of claim 18 further comprising, after the comparing step, the step of incrementing the protection counter if the calculated rate of change is at a minimum.

20. The method of claim 19 further comprising the step of determining if the protection counter is at its maximum count.

21. The method of claim 20 further comprising the step of detecting that the modem is connected to a DPBX.

22. Apparatus in a modem for detecting the presence of a DPBX connected to the t-r connection of a modem interface, comprising:

an analog-to-digital converter for reading the voltage of a node in the modem interface when the modem is on-hook and after the modem goes off-hook; and a controller for calculating the t-r voltage (Vtr) while the modem is on-hook, calculating the Vtr and line current (Itr) when the modem goes off-hook, and calculating the equivalent loop resistor (Rs) for the PSTN using the above calculated Vtr and Itr values, and notifying a user, the modem is connected to a wrong connection if the calculated loop resistor (Rs) is less than an expected Rs value.

23. The apparatus of claim 22 wherein the controller calculates Vtr while the modem is on-hook using the equation, $$Vtr = Vn[(R_1 + R_2 // R_3 / (R_2 // R_3)]$$

where Vtr represents Vbatt at the central office, and calculates Vtr and Itr while the modem is off-hook using the above equation for Vtr and the following equation for Itr, $$Itr = \frac{Vn}{Re}$$

and then calculates the equivalent loop resistance (Rs) using the equation, $$Rs = (Vbatt - Vtr)/Itr.$$

24. Apparatus in a modem for detecting the presence of a DPBX connected to the t-r connection of a modem interface, comprising:

an analog-to-digital converter for reading the tip to ring (t-r) voltage two separates times when the modem goes off-hook; and a controller for calculating the equivalent loop resistance (Rs) for a PSTN by solving two sets of equations for Vtr, using the two read Vtr values, and notifying the user the modem is connected to a wrong connection if the calculated loop resistance (Rs) is less than an expected Rs value.

25. The apparatus of claim 24 wherein the controller calculates the equivalent loop resistance (Rs) using the two equations:

$$Vbatt - Rs \times Itr(1) = Vtr(1)$$

$$Vbatt - Rs \times Itr(2) = Vtr(2).$$

* * * * *